United States Patent
Guney et al.

(10) Patent No.: US 12,073,244 B2
(45) Date of Patent: Aug. 27, 2024

(54) TASK SCHEDULING FOR AGENT PREDICTION

(71) Applicant: Waymo LLC, Mountain View, CA (US)

(72) Inventors: Tacettin Dogacan Guney, San Jose, CA (US); Kai Ding, Santa Clara, CA (US); Olivier Gravel Aubin, Calgary (CA)

(73) Assignee: Waymo LLC, Mountain View, CA (US)

( * ) Notice: Subject to any disclaimer, the term of this patent is extended or adjusted under 35 U.S.C. 154(b) by 295 days.

(21) Appl. No.: 16/935,057

(22) Filed: Jul. 21, 2020

(65) Prior Publication Data
US 2022/0027193 A1    Jan. 27, 2022

(51) Int. Cl.
*G06F 9/48*     (2006.01)
*B60K 31/00*    (2006.01)
(Continued)

(52) U.S. Cl.
CPC ............ *G06F 9/4881* (2013.01); *B60K 31/00* (2013.01); *B60K 31/0008* (2013.01); *G06F 9/3851* (2013.01); *G06F 9/48* (2013.01); *G06F 9/4806* (2013.01); *G06F 9/4843* (2013.01); *G06F 9/50* (2013.01); *G06F 9/5005* (2013.01); *G06F 9/5027* (2013.01); *G06F 9/5038* (2013.01); *G06F 9/5044* (2013.01); *G06F 9/5094* (2013.01); *G06N 5/00* (2013.01); *G06N 20/00* (2019.01)

(58) Field of Classification Search
CPC ....... B60K 31/00; B60K 31/0008; G06F 9/50; G06F 9/5005; G06F 9/5027; G06F 9/5038; G06F 9/5044; G06F 9/5094; G06F 9/3851; G06F 9/48; G06F 9/4806; G06F 9/4843; G06F 9/4881; G06N 5/00; G06N 20/00
See application file for complete search history.

(56) References Cited

U.S. PATENT DOCUMENTS

2015/0348417 A1*  12/2015  Ignaczak ................ G08B 25/08
                                              340/435
2016/0176398 A1*   6/2016  Prokhorov ............ B60W 30/09
                                              701/23
(Continued)

*Primary Examiner* — Charles M Swift
(74) *Attorney, Agent, or Firm* — Fish & Richardson P.C.

(57) ABSTRACT

Methods, systems, and apparatus, including computer programs encoded on a computer storage medium, for determining a task schedule for generating prediction data for different agents. In one aspect, a method comprises receiving data that characterizes an environment in a vicinity of a vehicle at a current time step, the environment comprising a plurality of agents; receiving data that identifies high-priority agents for which respective data characterizing the agents must be generated at the current time step; identifying available computing resources at the current time step; processing the data that characterizes the environment using a complexity scoring model to determine a respective complexity score for each of the high-priority agents; and determining a schedule for the current time step that allocates the generation of the data characterizing the high-priority agents across the available computing resources based on the complexity scores.

20 Claims, 4 Drawing Sheets

(51) Int. Cl.
*G06F 9/38* (2018.01)
*G06F 9/50* (2006.01)
*G06N 5/00* (2023.01)
*G06N 20/00* (2019.01)

(56) References Cited

U.S. PATENT DOCUMENTS

| | | | |
|---|---|---|---|
| 2016/0266930 A1* | 9/2016 | Jones | G06Q 40/02 |
| 2017/0120904 A1* | 5/2017 | Kentley | B60Q 1/525 |
| 2019/0009790 A1* | 1/2019 | Michalakis | H04L 67/12 |
| 2020/0086861 A1* | 3/2020 | McGill, Jr. | G05D 1/0231 |
| 2020/0142737 A1 | 5/2020 | Li et al. | |
| 2020/0210921 A1 | 7/2020 | Gibrekhterman et al. | |
| 2020/0356416 A1 | 11/2020 | Kim et al. | |
| 2021/0031758 A1* | 2/2021 | Urano | B60K 35/00 |

* cited by examiner

TASK SCHEDULING FOR AGENT PREDICTION

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes how a system implemented as computer programs can generate prediction data (e.g., behavior prediction data) or perception data (e.g., action recognition, pose estimation, or gaze/gesture detection data) for agents in the vicinity of a vehicle in accordance with a dynamically determined task assignment schedule. The system can be, for example, an on-board system of the vehicle or a simulated on-board system that is hosted remotely, for example, within a data center.

In general, one innovative aspect of the subject matter described in this specification can be embodied in methods that include the actions of, at each of a plurality of time steps: receiving data that characterizes an environment in a vicinity of a vehicle at a current time step, the environment comprising a plurality of agents; receiving data that identifies, as high-priority agents, a proper subset of the plurality of agents for which respective data characterizing the agents must be generated at the current time step; identifying computing resources that are available for generating the respective data characterizing the high-priority agents at the current time step; processing the data that characterizes the environment using a complexity scoring model to determine one or more respective complexity scores for each of the high-priority agents, each respective complexity score characterizing an estimated amount of computing resources that is required for generation of the data characterizing the high-priority agent using a prediction model; and determining a schedule for the current time step that allocates the generation of the data characterizing the high-priority agents across the available computing resources based on the complexity scores.

In some implementations, the method further includes: generating, using the prediction model and in accordance with the scheduling, respective data characterizing the high-priority agents; and providing the respective data characterizing the high-priority agents to a planning system of the vehicle to generate planning decisions which plan a future trajectory of the vehicle.

In some implementations, the computing resources support concurrent execution of a fixed number of threads.

In some implementations, each thread comprises one or more tasks; each task comprises generating data characterizing an agent using the prediction model; and each task has a respective length that corresponds to an amount of computing resource required to generate data characterizing the agent.

In some implementations, determining the schedule for the current time step includes, for each thread: determining, based on the respective complexity scores, an order of the one or more tasks in the thread.

In some implementations, the data characterizing the agent comprises one or more predicted future trajectories of the agent.

In some implementations, determining a schedule for the current time step further includes: determining remaining computing resources that are available for the generation of data characterizing one or more low-priority agents at the current time step, the one or more low-priority agents corresponding to one or more of the plurality of agents that are not identified as high-priority agents.

In some implementations, the method further includes: processing the data that characterizes the one or more low-priority agents using the complexity scoring model to determine one or more respective complexity scores for each of the one or more low-priority agents; identifying, from the one or more low-priority agents and based on the respective complexity scores and also on the remaining computing resources, one or more identified low-priority agents; and adjusting the schedule for the current time step to allocate the generation of the data characterizing the one or more identified low-priority agents across the remaining available computing resources.

In some implementations, receiving data that identifies, as high-priority agents, a proper subset of the plurality of agents for which respective data characterizing the agents must be generated at the current time step includes: processing data that characterizes the plurality of agents in the environment using an importance scoring model to generate an output that defines a respective importance score for each of a plurality of agents, wherein the importance score for an agent characterizes an estimated impact of the agent on planning decisions generated by the planning system of the vehicle which plans the future trajectory of the vehicle; and identifying, as high-priority agents, the proper subset of the plurality of agents with the highest importance scores.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

In order for a planning system of a vehicle to generate planning decisions which cause the vehicle to travel along a safe and comfortable trajectory, the planning system must be provided with timely and accurate prediction or perception data for the agents in the vicinity of the vehicle. However, generating prediction data for an agent in the vicinity of the vehicle may require substantial computing resources (e.g., wall clock time, computing power, e.g., in terms of CPU cores or threads, or a combination thereof). In certain situations, a large number of other agents in the environment may be in the vicinity of the vehicle (e.g., when the vehicle is traveling along a busy highway). In these situations, for each prediction cycle, sub-optimal schedules for allocation of different agent prediction tasks among the limited computing resources available on-board the vehicle can be problematic. The sub-optimal schedules generally refer to schedules that fail to utilize the available computing resources in an effective manner, e.g., in terms of capacity, efficiency, or both, and thereby result in delay or negligence in generating prediction data for agents which are likely to have significant impact on the planning decisions generated by the planning system.

The on-board system described in this specification can estimate, prior to each prediction cycle, varying amounts of computing resources that will be required for generating prediction data for the plurality of agents and thereafter determine a schedule for optimally allocating the prediction data generation tasks across available computing resources based on the estimation. By generating prediction data in accordance with the schedule, the on-board system can make highly efficient use of its limited computing resources so as to maximize the amount of prediction data that can be generated during each prediction cycle, i.e., within a fixed time duration, while ensuring prompt generation of prediction data for agents that are likely to have the biggest impact on the planning decisions generated by the planning subsystem. In this manner, the on-board system described in this specification can generate timely and adequate prediction data which enables the planning system to generate planning decisions that cause the vehicle to travel along a safe and comfortable trajectory despite the limited computing resources available on-board the vehicle.

By using the described techniques to schedule predictions on-board the vehicle, the system can use the same techniques in simulation, e.g., at a data center physically remote from the on-board system, to accurately replicate exactly how the on-board system would make predictions in real-time. This is advantageous because in this way the system can rapidly and effectively evaluate an arbitrary number of alternative scheduling, prediction or planning algorithms, e.g., in cases of system upgrade or code change, without the need to actually drive the vehicle around in real-world environment at additional equipment or human labor costs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can generate prediction data (e.g., behavior prediction data) for agents in the vicinity of a vehicle in accordance with a dynamically determined task assignment schedule. The agents in the vicinity of the vehicle may be, for example, pedestrians, bicyclists, or other vehicles. The system can be, for example, an on-board system of the vehicle or a simulated on-board system that is hosted remotely, for example, within a data center. In particular, the schedule optimally allocates the execution of prediction data generation tasks among available computing resources of the system, thereby maximizing the amount of prediction data that can be generated during each prediction cycle that has a fixed time duration. To generate the dynamic schedule, the system consumes perception data, information derived from perception data, or both. These features and other features are described in more detail below.

Figure 1:
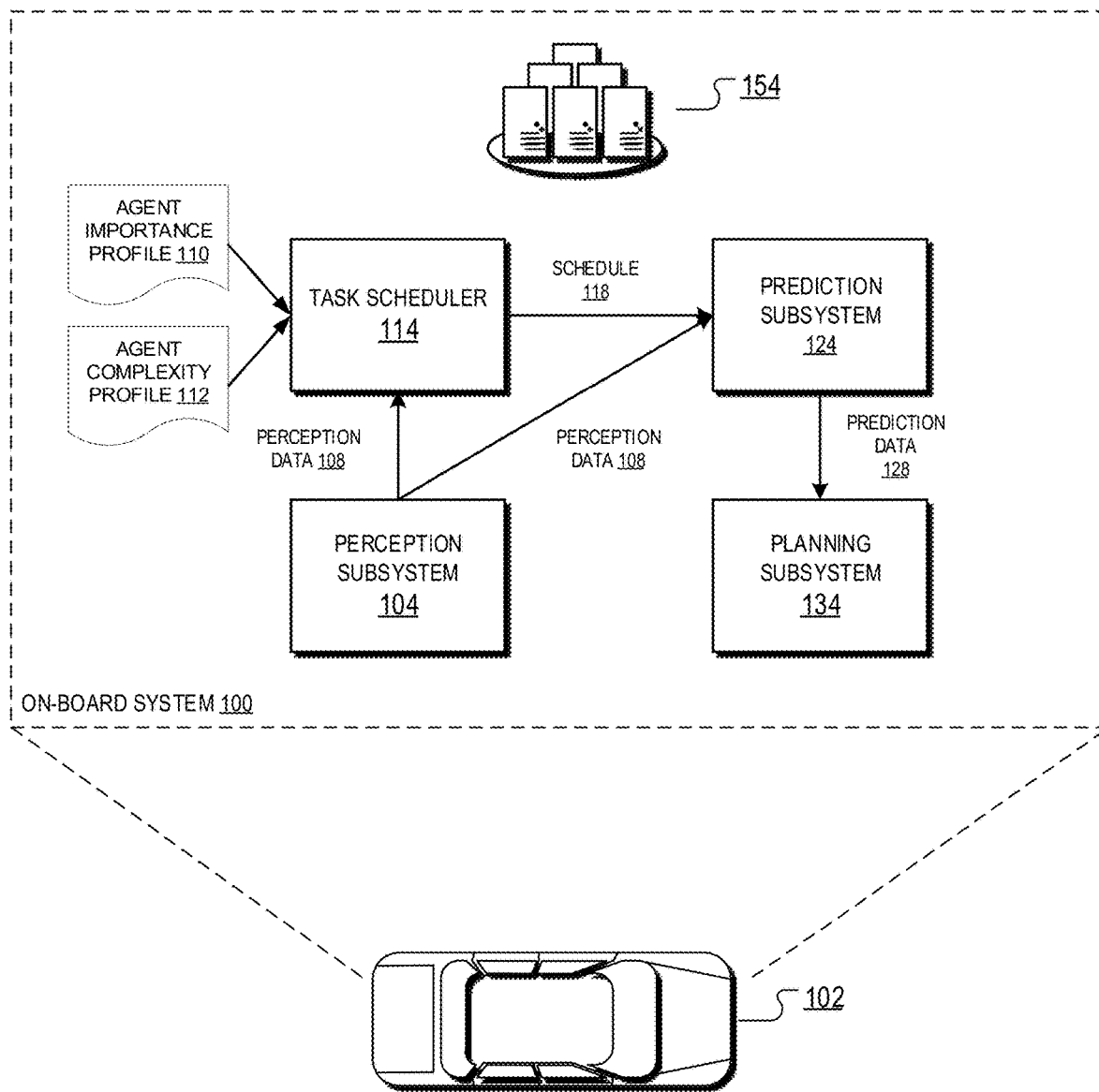
FIG. 1 is a block diagram of an example on-board system.

FIG. 1 is a block diagram of an example on-board system 100. The on-board system 100 is composed of hardware and software components, some or all of which are physically located on-board a vehicle 102.

The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a full-vehicle prediction indicates that a human driver is about to collide with a detected object, e.g., a pedestrian, a cyclist, another vehicle. While the vehicle 102 is illustrated in FIG. 1 as being an automobile, the vehicle 102 can be any appropriate vehicle that uses perception data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a data processing apparatus 154 that includes data processing hardware of any of a variety of kinds of apparatus, devices, and machines that provides a pool of computing resources for processing data. By way of example, the data processing apparatus 154 can include a programmable processor, a computer, or multiple processors or computers. The data processing apparatus 154 can also be, or further include, special purpose logic circuitry, e.g., an FPGA (field programmable gate array) or an ASIC (application-specific integrated circuit).

The on-board system 100 includes a perception subsystem 104 which enables the on-board system 100 to "see" the environment in a vicinity of the vehicle 102. The perception subsystem 104 includes one or more sensors, some of which are configured to receive reflections of electromagnetic radiation from the environment in the vicinity of the vehicle 102. For example, the perception subsystem 104 can include one or more laser sensors (e.g., LIDAR sensors) that are configured to detect reflections of laser light. As another example, the perception subsystem 104 can include one or more radar sensors that are configured to detect reflections of radio waves. As another example, the perception subsystem 104 can include one or more camera sensors that are configured to detect reflections of visible light.

The perception subsystem 104 repeatedly (i.e., at each of multiple time steps) captures raw sensor measurements which can indicate the directions, intensities, and distances travelled by reflected radiation. For example, a sensor in the perception subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The perception subsystem 104 can use the raw sensor measurements that are continually generated by the sensors to continually generate perception data 108 that characterizes the latest state of an environment (i.e., the state of the environment at the current time step) in the vicinity of the vehicle 102. In particular, the perception data 108 includes data that describes any agents that are present in the vicinity of the vehicle 102. The agents in the vicinity of the vehicle 102 may be, for example, pedestrians, bicyclists, or other vehicles.

The data describing an agent may refer to, for example, data defining the classification of agent type, the spatial position occupied by the agent in the environment, or characteristics of the motion of the agent. The characteristics of the motion of an agent can include, for example, the velocity of the agent (e.g., measured in miles per hour—mph), the acceleration of the agent (e.g., measured in feet per second squared), and the heading of the agent (e.g., measured in degrees). The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

The on-board system 100 uses the prediction subsystem 124 to continually (i.e., at each of multiple time steps) generate prediction data 128 which characterizes some or all of the agents in the vicinity of the vehicle 102. The interval between every two adjacent time steps will be referred to as a "prediction cycle" in this specification. Each interval typically has a fixed time duration. The prediction subsystem 124 implements one or more prediction models that are each configured to process an input that includes the perception data 108 in accordance with parameter values of the model to generate an output that defines corresponding prediction data 128.

For example, for each of multiple agents in the vicinity of the vehicle 102, the prediction data 128 may be trajectory prediction data which specifies respective predicted future trajectories of the agent. Each predicted future trajectory specifies a possible path, i.e., a predicted future path, in the environment along which the agent will travel within a certain period of time in the future, e.g., within the next 5 seconds after the current time point. As another example, for each of the multiple agents in the vicinity of the vehicle 102, the prediction data 128 may be behavior prediction data which defines respective probabilities that the agent makes each of a predetermined number of possible driving decisions (e.g., yielding, changing lanes, passing, braking, or accelerating).

The on-board system 100 can provide the prediction data 128 generated by the prediction subsystem 124 to a planning subsystem 134.

When the planning subsystem 134 receives the prediction data 128, the planning subsystem 134 can use the prediction data 128 to generate planning decisions which plan the future trajectory of the vehicle 102. The planning decisions generated by the planning subsystem 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning subsystem 110 with prediction data 128 indicating that the future trajectory of another vehicle is likely to cross the future trajectory of the vehicle 102, potentially resulting in a collision. In this example, the planning subsystem 110 can generate a planning decision to apply the brakes of the vehicle 102 to avoid a collision.

The planning decisions generated by the planning subsystem 134 can be provided to a control system of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

In order for the planning subsystem 134 to generate planning decisions which cause the vehicle 102 to travel along a safe and comfortable trajectory, the on-board system 100 must provide the planning subsystem 110 with timely and accurate prediction data 128. However, the prediction subsystem 124 may require substantial computing resources (e.g., wall clock time, memory, computing power, or a combination thereof) to generate prediction data 128 for an agent in the vicinity of the vehicle. In various situations, a large number of other agents in the environment may be in the vicinity of the vehicle 102, for example, when the vehicle 102 is traveling along a busy highway or a complex urban scenario.

Thus, to enable the prediction subsystem 124 to generate timely and adequate prediction data 128, and in particular, to avoid delay or negligence in generating prediction data 128 for agents which are likely to have significant impact on the planning decisions generated by the planning subsystem 134, the on-board system 100 uses a task scheduler 114 to determine a schedule which optimally allocates the prediction data generation tasks for different agents among available computing resources supplied by the data processing apparatus 154. In particular, the task scheduler 114 prioritizes prediction data generation tasks for agents that are likely to have greater impact on the planning decisions generated by the planning subsystem 134. Overall utilization rate, e.g., in terms of utilization percentage over each prediction cycle, of the computing resources is generally improved when the tasks are executed in accordance with the schedule.

The task scheduler 114 implements software that is configured to schedule the execution of a single thread of tasks or multiple concurrent threads of tasks by the data processing apparatus 154. A thread, which may also be referred to as a pipeline, can include a sequence of one or more tasks to be executed in series on a same hardware/virtual component of the data processing apparatus 154. For example, if the data processing apparatus 154 includes a multi-core processor, then each processor core can execute an independent thread. Each task, which may also be referred to as a job, is a task for generating data that characterizes a given agent, e.g., by using one or more prediction models. Each task also has a length that corresponds to an amount of computing resource, e.g., in terms of wall clock time, computing power, memory, or a combination thereof that is required for generating the prediction data that characterizes the given agent. Determining the schedule 118 will be described in more detail below with reference to FIGS. 2-4.

To generate the schedule 118, the task scheduler 114 consumes both perception data 108 and information derived from the perception data 108, i.e., agent importance profile 110 and agent complexity profile 112. In particular, the system 100 can use an importance scoring model and a complexity scoring model to derive such information from the perception data 108.

The importance scoring model is configured to process an input that includes the perception data 108 in accordance with parameter values of the importance scoring model to generate an output that specifies the agent importance profile 110.

For example, the agent importance profile 110 can define a ranking of the plurality of agents in order of their impact on the planning decisions generated by the planning system 134 which plans the future trajectory of the vehicle 102. The ranking of the agents can be broadly understood to be any data which defines that certain agents in the vicinity of the vehicle have a greater impact on the planning decisions than certain other agents in the vicinity of the vehicle. For example, the ranking of the agents may define an explicit ordering of the agents from highest-rank to lowest-ranked, where each agent is assigned a distinct rank. As another example, the ranking of the agents may define a partition of the agents into multiple groups, where each group includes one or more agents. For each pair of groups including a first group and a second group, the ranking may define whether the agents in the first group have a greater impact on the planning decisions than the agents in the second group. The agents within a given group may be understood to have an equivalent impact on the planning decisions.

As another example, the agent importance profile 110 can define respective importance scores for the agents in the vicinity of the vehicle. The importance score for an agent characterizes an estimated impact of the agent on the planning decisions generated.

In some of these examples, the profile 112 explicitly specifies, e.g., by using tags or labels, one or more of the agents in the vicinity of the vehicle to be high-priority agents for which respective data characterizing the agents must be generated at the current time step.

In some of these examples, the on-board system 100 can identify, i.e., based on corresponding ranks or scores specified in the profile 110, one or more of the agents in the vicinity of the vehicle to be high-priority agents. In some cases, the on-board system 100 identifies only a fraction of the agents in the vicinity of the vehicle 102 as high-priority agents. Correspondingly, any remaining agents which are not identified as high-priority agents will be referred to in this specification as "low-priority" agents. Low-priority agents generally have less impact on the planning decisions made by the planning subsystem 134 than the high-priority agents.

The on-board system 100 can use a complexity scoring model to process an input that includes the perception data 108 in accordance with parameter values of the complexity scoring model to generate an output that specifies the agent complexity profile 112. Specifically, the profile 112 includes data that specifies, for each of some or all of the plurality of agents, an estimated amount of computing resources that is required for generating prediction data that characterizes the agent. In some cases, the agent complexity profile 112 only defines complexity scores for the high-priority agents. Alternatively, in some cases, the agent complexity profile 112 defines complexity scores for all of the plurality of agents, i.e., including both high-priority and low-priority agents.

The complexity scores of the agents can be broadly understood to be any data in numeric format which quantitatively defines an estimation of the required computing resources, e.g., in terms of wall clock time, computing power, e.g., in terms of CPU cores or threads, or a combination thereof. An agent assigned a higher complexity score may also be understood as requiring extra computing resources in order to generate corresponding prediction data 128 which characterizes the agent, when compared with another agent assigned a lower complexity score.

In this specification, a "prediction model" should be understood as implementing a prediction algorithm. Similarly, an "importance scoring model" and a "complexity scoring model" should be understood as implementing an importance scoring algorithm and a complexity scoring algorithm, respectively. Each such model can be implemented, for example, as a trainable machine learning model, e.g., a neural network model, a random forest model, or a support vector machine (SVM) model, or as a heuristics or deterministic model.

In a particular example, one of the prediction models may be a neural network that is configured to process an input that includes the perception data 108 to generate an output that defines a predicted future trajectory for a given agent in the vicinity of the vehicle 102. For example, the output can be a multi-dimensional array of data values (e.g., top-view image with fixed size) which depicts the geometry of the predicted future trajectory.

By generating prediction data 128 in accordance with the schedule 118, the on-board system 100 can make highly efficient use of its limited computing resources so as to maximize the amount of prediction data that can be generated during each prediction cycle, while ensuring prompt generation of prediction data for agents that are likely to have the biggest impact on the planning decisions generated by the planning subsystem 134. In this manner, the on-board system 100 can generate timely and adequate prediction data 128 which enables the planning subsystem 134 to generate planning decisions that cause the vehicle to travel along a safe and comfortable trajectory despite the limited computing resources available on-board the vehicle 102.

When the on-board system 100 is a simulated system that is hosted remotely, for example, within a data center, the system can use the same task scheduling techniques in simulation to accurately replicate exactly how the on-board system would make predictions in real-time. This is advantageous because in this way the system can rapidly and effectively evaluate an arbitrary number of alternative scheduling, prediction or planning algorithms, e.g., in cases of system upgrade or code change, without the need to actually drive the vehicle around in real-world environment at additional equipment or human labor costs.

Figure 2:
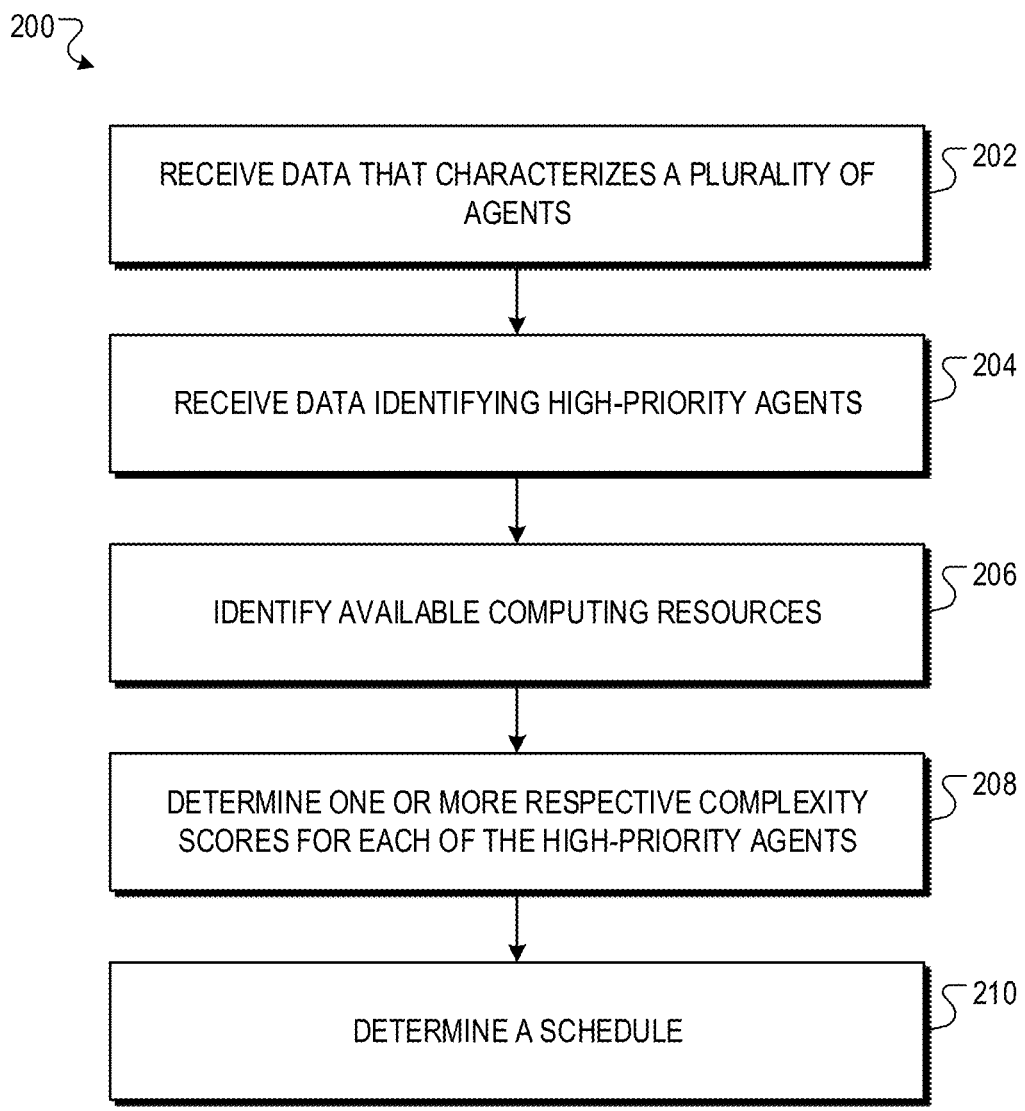
FIG. 2 is a flow diagram of an example process for determining a schedule for generating data characterizing agents.

FIG. 2 is a flow diagram of an example process 200 for determining a schedule for generating data characterizing agents. For convenience, the process 200 will be described as being performed by a system of one or more computers located in one or more locations. For example, an on-board system, e.g., the on-board system 100 of FIG. 1, appropriately programmed in accordance with this specification, can perform the process 200.

In general, the system repeatedly performs the process 200 to generate a schedule at each of multiple time steps. For convenience, each of the following steps will be described as being performed at a "current" time step.

The system receives data that characterizes the latest state of an environment (i.e., the state of the environment at the current time step) in the vicinity of the vehicle (202). In particular, the data includes perception data that describes a plurality of agents that are present in the vicinity of the vehicle. The perception data may be real perception data characterizing a real-world environment in the vicinity of a vehicle, or simulated perception data characterizing a simulated environment in the vicinity of a simulated vehicle. As described above, the perception data may be generated from raw sensor measurements captured by one or more sensors of the vehicle, including one or more of: laser sensors, radar sensors, and camera sensors.

The system receives data that identifies high-priority agents for which respective prediction data characterizing the agents must be generated at the current time step (204). As described above, the data identifying high-priority agents includes an agent importance profile that is generated by an importance scoring model based on processing the perception data. In some cases, the agent importance profile explicitly specifies, e.g., by using tags or labels, one or more of the agents in the vicinity of the vehicle to be high-priority agents. Additionally or alternatively, the system can identify, i.e., based on corresponding ranks or scores specified in the profile, one or more of the agents in the vicinity of the vehicle to be high-priority agents.

The system identifies computing resources that are available for making a prediction of the behavior of the plurality of agents at the current time step (206). For example, to determine resource availability, the system can access monitoring or reporting data regarding the utilization, capacity or configuration of the data processing apparatus, e.g., data processing apparatus 154 of FIG. 1, that supplies a pool of computing resources. The pool of computing resources can be defined, for example, in terms of a thread pool pattern. By monitoring the usage of the computing resources of the data processing apparatus, the system can become aware of when or which computing resources in the pool are available. Available computing resources generally correspond to resources for which at least some processing cycles are not utilized or at least not utilized fully. For example, computing resources to which the agent prediction data generation tasks have not been assigned may be considered available.

The system determines one or more respective complexity scores for each of the high-priority agents (208) that characterizes an estimated amount of computing resources that is required for generating data characterizing the high-priority agent using one or more prediction models. The system can do so by processing the perception data that characterizes the latest state of an environment using one or more complexity scoring models. For each high-priority agent, the complexity score defines a numeric estimation of the computing resources, e.g., in terms of wall clock time, computing power, memory, or a combination thereof that is required for generating data that characterizes the agent using a prediction model.

In some implementations, for each high-priority agent, the system can determine a first complexity score based on using a high-precision prediction model and a second complexity score based on using a less computationally intensive (but potentially less precise) prediction model. For example, the less computationally intensive prediction model may have fewer layers, fewer parameters, or both than the high-precision prediction model.

The complexity scoring model can be implemented, for example, as a trainable machine learning model, e.g., a neural network model, a random forest model, or a support vector machine (SVM) model, or as a heuristics or deterministic model. In a particular example, the complexity scoring model may be a convolutional neural network, that is, a neural network that includes one or more convolutional layers. The convolutional neural network may be configured to process an input that includes the perception data to generate an output channel that is represented as a two-dimensional array of data values, where each position in the output channel corresponds to a respective spatial position in the environment. For each spatial position in the environment that is occupied by an agent, the position in the output channel that corresponds to the spatial position defines the complexity score of the agent. In this example, the system may determine the complexity scores for each agent as the value defined by the position in the output channel that corresponds to the spatial position in the environment that is occupied by the agent.

The system determines a schedule for the current time step (210) that allocates the generation of the data characterizing the high-priority agents across the available computing resources based on the complexity scores. In particular, the system determines the schedule by determining an order of prediction data generation tasks for respective agents according to their complexity scores and thereafter prioritizing, in each thread, the prediction data generation tasks for agents having the highest complexity scores.

Figure 3A:
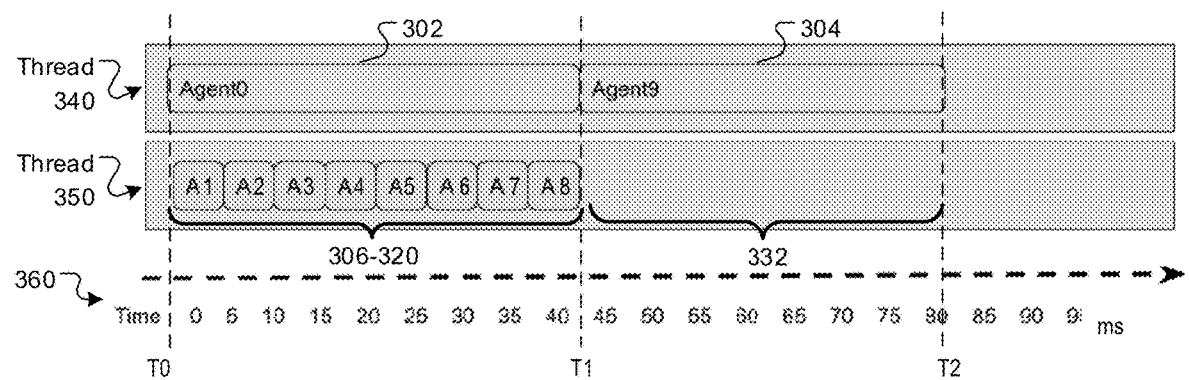
FIG. 3A-B are illustrations of example schedules for generating data characterizing agents using a multithreaded processing system.
Figure 3B:
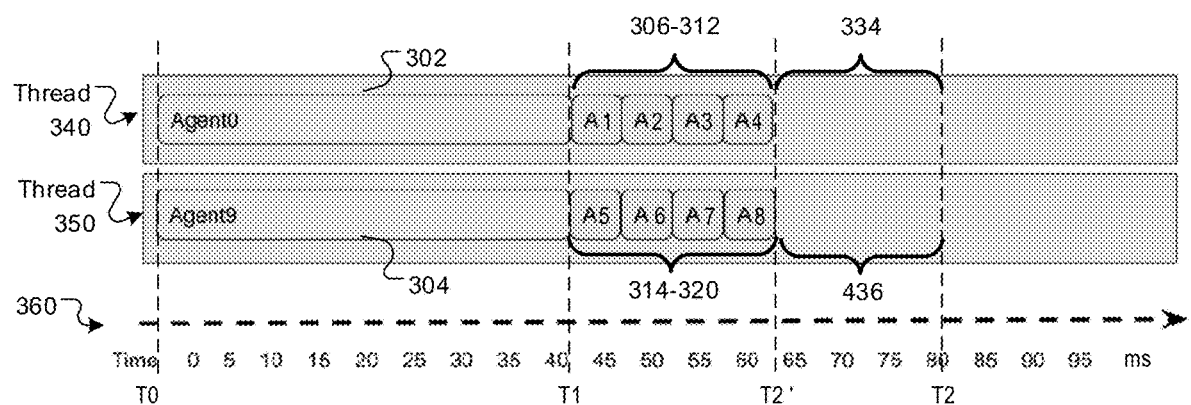

FIG. 3A-B are illustrations of example schedules for generating data characterizing agents using a multithreaded processing system. The multithreaded processing system can be the on-board system 100 of FIG. 1, which includes the data processing apparatus 154 that can execute multiple threads, e.g., thread 340 and thread 350.

In particular, FIG. 3A shows an example of a task schedule determined using a conventional task assignment algorithm which can be, for example, a longest job first (LJF), a shortest job first (SJF), or a first-in-first-out (FIFO) scheduling algorithm. As depicted in FIG. 3A, thread 340 and thread 350 can concurrently execute in the multithreaded processing system along a time line 360. Each thread includes a sequence of one or more tasks to be executed in series on the same hardware/virtual component of the multithreaded processing system, e.g., a same core within a multi-core processor. Specifically, thread 340 includes tasks 302 and 304, which correspond to generating prediction data that characterizes Agent 0 and Agent 9, respectively. Thread 350 includes 8 tasks, i.e., tasks 306-320, which correspond to generating prediction data that characterizes Agents 1-8, respectively. A prediction cycle of each thread is 80 ms.

At time point T0 (0 ms), the system may begin execution of task 302 in thread 340 by starting to execute instructions of the task 302. Concurrently, the system may begin execution of task 306 by starting to execute instructions of the task 306. The computing resources of the system are utilized to execute the task instructions. At time point T1 (40 ms), the system may begin execution of task 304 in thread 340 and, because no additional tasks have been scheduled, an "idle" task 332 in thread 350. That is, in this example of FIG. 3A, the computing resources (e.g., in terms of processing cycles) of thread 350 are not fully utilized at least between time point T1 and T2 (80 ms). In this way, when this prediction cycle terminates at time point T2, the system is able to generate data characterizing a total of 10 agents, i.e., Agents 0-10.

In contrast, by iterating through steps 202-210 as described above, the system can determine an improved schedule for the same tasks, i.e., tasks 302-320, that more effectively utilizes available computing resources.

As depicted in FIG. 3B, the system determines a schedule in which both threads 340 and 350 begin the prediction cycle by generating prediction data for agents having the highest complexity scores. Specifically, at time point T0 (0 ms), the system may begin concurrent executions of tasks 302 and 304 in threads 340 and 350 by starting to execute instructions of the tasks, respectively. At time point T1 (40 ms), the system has completed both tasks 302 and 304 and may begin concurrent execution of tasks 306 and 314 in thread 340 and 350. At time point T2' (60 ms), the system has completed execution of all tasks 302-320 that would have taken the system an additional 20 ms (computed as the difference between T2 and T2') to complete if these tasks were executed in accordance with the example schedule of FIG. 3A. In some cases, the system can use a prediction subsystem to execute the prediction data generation tasks in accordance with the schedule, and then immediately initiate a new prediction cycle to begin executing different tasks in accordance with a new schedule. In some cases, as will be described further below, the system can adjust the schedule to effectively utilize the remaining computing resources in this prediction cycle, as denoted by 334 and 436 in threads 340 and 350.

Although FIG. 3B illustrates an improved schedule in which both threads begin the prediction cycle by generating prediction data for agents having the highest complexity scores, this is not required. In various cases, a different task scheduling scheme may be more advantageous. For example, the system can determine an improved schedule in which both threads begin the prediction cycle by generating prediction data for agents having the lowest complexity scores, e.g., tasks 306-312 in thread 340 and tasks 314-320 in thread 350.

Figure 4:
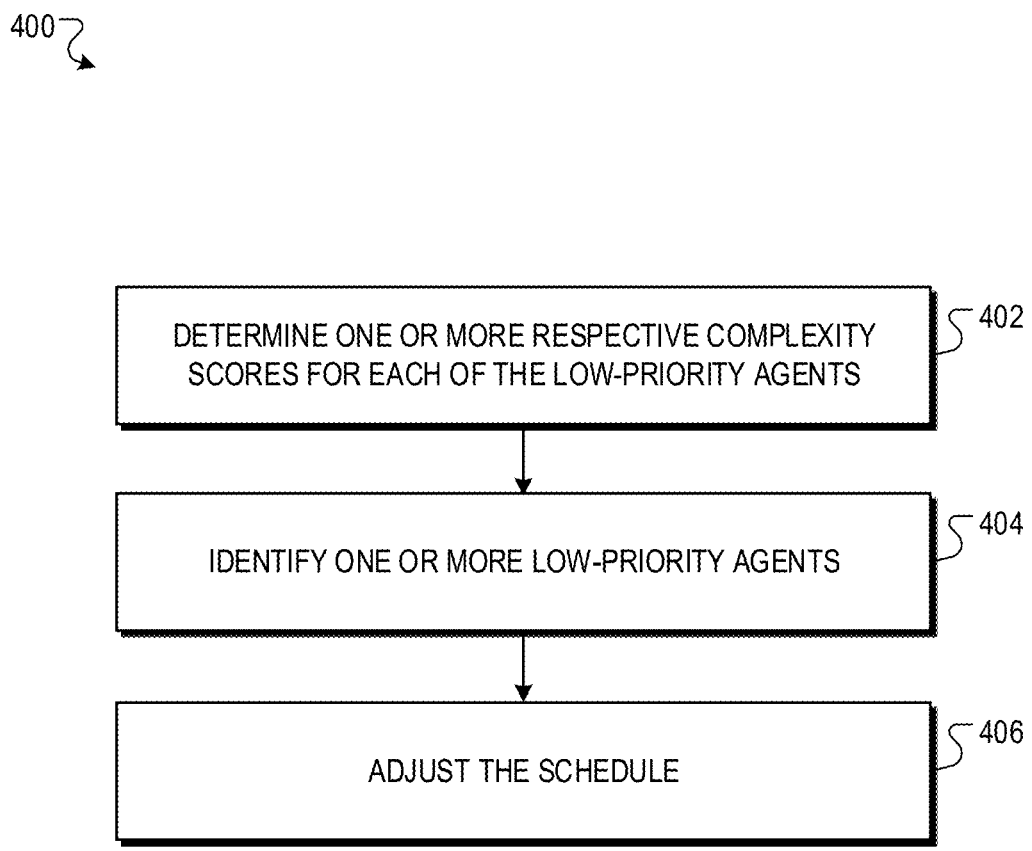
FIG. 4 is a flow diagram of an example process for adjusting a schedule for generating data characterizing agents.

FIG. 4 is a flow diagram of an example process 400 for adjusting a schedule for generating data characterizing agents. For convenience, the process 400 will be described as being performed by a system of one or more computers located in one or more locations. For example, an on-board system, e.g., the on-board system 100 of FIG. 1, appropriately programmed in accordance with this specification, can perform the process 400.

The system determines one or more respective complexity scores for each of the one or more low-priority agents (402) that characterizes an estimated amount of computing resources that is required for generating data characterizing the low-priority agent using one or more prediction models. The system can do so by processing the perception data that characterizes the latest state of an environment using one or more complexity scoring models. As similarly described above, the system can determine different complexity scores for each low-priority agent based on processing the same agent using different prediction models.

The system identifies, from the low-priority agents, one or more identified low-priority agents (404) based on the complexity scores and also on the remaining available computing resources in this prediction cycle. In particular, the estimated total amount of computing resources required for generating prediction data for these identified low-priority agents is no greater than that of the remaining available computing resources.

The system adjusts the schedule for the current time step (406) to allocate the prediction data generation tasks for the one or more identified low-priority agents across the remaining available computing resources.

Referring back to the example of FIG. 3B, the system can adjust the schedule to assign, to each of the threads 340 and 350, one or more prediction data generation tasks that would take no longer than 20 ms to complete when executed in series. This allows for the system to utilize the remaining computing resources in this prediction cycle, as denoted by 334 and 436 in threads 340 and 350.

The system can then use a prediction subsystem to execute the prediction data generation tasks in accordance with the schedule, i.e., the timing schedule, the prediction model selection schedule, or both. In this manner, the system effectively maximizes an amount of prediction data that can be generated during each prediction cycle, while ensuring prediction data characterizing the high-priority agents is promptly generated. The prediction data generated in this manner generally enables the planning system to generate planning decisions that cause the vehicle to travel along a safe and comfortable trajectory despite the limited computational resources available on-board the vehicle.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising, at each of a plurality of time steps:
   receiving data that characterizes an environment in a vicinity of a vehicle at a current time step, the environment comprising a plurality of agents;
   receiving data that identifies, as high-priority agents, a proper subset of the plurality of agents for which respective data characterizing the agents must be generated at the current time step;
   identifying computing resources provided by data processing computer hardware on-board the vehicle that are available for executing a task on-board the vehicle, the task comprising generating the respective data characterizing the high-priority agents in the environment in the vicinity of the vehicle at the current time step;
   processing the data that characterizes the environment using a complexity scoring machine learning model to determine one or more respective complexity scores for each of the high-priority agents, each respective complexity score characterizing an estimated amount of computing resources that is required for executing the task on-board the vehicle;
   determining, based on the complexity scores, a schedule for the current time step that allocates the execution of the task across the available computing resources that are provided by the data processing computer hardware on-board the vehicle; and
   allocating, in accordance with the schedule, the execution of the task across the available computing resources that are provided by the data processing computer hardware on-board the vehicle.

2. The method of claim 1, further comprising:
   generating, using a prediction model and in accordance with the scheduling, respective data characterizing the high-priority agents; and
   providing the respective data characterizing the high-priority agents to a planning system of the vehicle to generate planning decisions which plan a future trajectory of the vehicle.

3. The method of claim 1, wherein the computing resources support concurrent execution of a fixed number of threads.

4. The method of claim 3, wherein:
   each thread comprises one or more tasks;
   each task comprises generating data characterizing an agent using the prediction model; and
   each task has a respective length that corresponds to an amount of computing resource required to generate data characterizing the agent.

5. The method of claim 1, wherein determining the schedule for the current time step comprises, for each thread:
   determining, based on the respective complexity scores, an order of the one or more tasks in the thread.

6. The method of claim 1, the data characterizing the agent comprises one or more predicted future trajectories of the agent.

7. The method of claim 1, wherein determining a schedule for the current time step further comprises:
   determining remaining computing resources that are available for the generation of data characterizing one or more low-priority agents at the current time step, the one or more low-priority agents corresponding to one or more of the plurality of agents that are not identified as high-priority agents.

8. The method of claim 7, further comprising:
   processing the data that characterizes the one or more low-priority agents using the complexity scoring model to determine one or more respective complexity scores for each of the one or more low-priority agents;
   identifying, from the one or more low-priority agents and based on the respective complexity scores and also on the remaining computing resources, one or more identified low-priority agents; and
   adjusting the schedule for the current time step to allocate the generation of the data characterizing the one or more identified low-priority agents across the remaining available computing resources.

9. The method of claim 1, wherein receiving data that identifies, as high-priority agents, a proper subset of the plurality of agents for which respective data characterizing the agents must be generated at the current time step comprises:
   processing data that characterizes the plurality of agents in the environment using an importance scoring model to generate an output that defines a respective importance score for each of a plurality of agents,
      wherein the importance score for an agent characterizes an estimated impact of the agent on planning decisions generated by the planning system of the vehicle which plans the future trajectory of the vehicle; and
   identifying, as high-priority agents, the proper subset of the plurality of agents with the highest importance scores.

10. A system comprising:
   one or more computers; and
   one or more storage devices communicatively coupled to the one or more computers, wherein the one or more storage devices store instructions that, when executed by the one or more computers, cause the one or more computers to perform operations comprising:
      receiving data that characterizes an environment in a vicinity of a vehicle at a current time step, the environment comprising a plurality of agents;
      receiving data that identifies, as high-priority agents, a proper subset of the plurality of agents for which respective data characterizing the agents must be generated at the current time step;
      identifying computing resources provided by data processing computer hardware on-board the vehicle that are available for executing a task on-board the vehicle, the task comprising generating the respective data characterizing the high-priority agents in the environment in the vicinity of the vehicle at the current time step;
      processing the data that characterizes the environment using a complexity scoring machine learning model to determine one or more respective complexity scores for each of the high-priority agents, each respective complexity score characterizing an estimated amount of computing resources that is required for executing the task on-board the vehicle;
      determining, based on the complexity scores, a schedule for the current time step that allocates the execution of the task across the available computing resources that are provided by the data processing computer hardware on-board the vehicle; and allocating, in accordance with the schedule, the execution of the task across the available computing resources that are provided by the data processing computer hardware on-board the vehicle.

11. The system of claim 10, wherein the operations further comprise:
generating, using a prediction model and in accordance with the scheduling, respective data characterizing the high-priority agents; and
providing the respective data characterizing the high-priority agents to a planning system of the vehicle to generate planning decisions which plan a future trajectory of the vehicle.

12. The system of claim 10, wherein the computing resources support concurrent execution of a fixed number of threads.

13. The system of claim 12, wherein:
each thread comprises one or more tasks;
each task comprises generating data characterizing an agent using the prediction model; and
each task has a respective length that corresponds to an amount of computing resource required to generate data characterizing the agent.

14. The system of claim 10, wherein determining the schedule for the current time step comprises, for each thread:
determining, based on the respective complexity scores, an order of the one or more tasks in the thread.

15. The system of claim 10, the data characterizing the agent comprises one or more predicted future trajectories of the agent.

16. The system of claim 10, wherein determining a schedule for the current time step further comprises:
determining remaining computing resources that are available for the generation of data characterizing one or more low-priority agents at the current time step, the one or more low-priority agents corresponding to one or more of the plurality of agents that are not identified as high-priority agents.

17. The system of claim 16, wherein the operations further comprise:
processing the data that characterizes the one or more low-priority agents using the complexity scoring model to determine one or more respective complexity scores for each of the one or more low-priority agents;
identifying, from the one or more low-priority agents and based on the respective complexity scores and also on the remaining computing resources, one or more identified low-priority agents; and
adjusting the schedule for the current time step to allocate the generation of the data characterizing the one or more identified low-priority agents across the remaining available computing resources.

18. The system of claim 10, wherein receiving data that identifies, as high-priority agents, a proper subset of the plurality of agents for which respective data characterizing the agents must be generated at the current time step comprises:
processing data that characterizes the plurality of agents in the environment using an importance scoring model to generate an output that defines a respective importance score for each of a plurality of agents,
wherein the importance score for an agent characterizes an estimated impact of the agent on planning decisions generated by the planning system of the vehicle which plans the future trajectory of the vehicle; and
identifying, as high-priority agents, the proper subset of the plurality of agents with the highest importance scores.

19. One or more non-transitory computer storage media storing instructions that when executed by one or more computers cause the one or more computers to perform operations comprising:
receiving data that characterizes an environment in a vicinity of a vehicle at a current time step, the environment comprising a plurality of agents;
receiving data that identifies, as high-priority agents, a proper subset of the plurality of agents for which respective data characterizing the agents must be generated at the current time step;
identifying computing resources provided by data processing computer hardware on-board the vehicle that are available for executing a task on-board the vehicle, the task comprising generating the respective data characterizing the high-priority agents in the environment in the vicinity of the vehicle at the current time step;
processing the data that characterizes the environment using a complexity scoring machine learning model to determine one or more respective complexity scores for each of the high-priority agents, each respective complexity score characterizing an estimated amount of computing resources that is required for executing the task on-board the vehicle;
determining, based on the complexity scores, a schedule for the current time step that allocates the execution of the task across the available computing resources that are provided by the data processing computer hardware on-board the vehicle; and
allocating, in accordance with the schedule, the execution of the task across the available computing resources that are provided by the data processing computer hardware on-board the vehicle.

20. The non-transitory computer storage media of claim 19, wherein the operations further comprise:
generating, using a prediction model and in accordance with the scheduling, respective data characterizing the high-priority agents; and
providing the respective data characterizing the high-priority agents to a planning system of the vehicle to generate planning decisions which plan a future trajectory of the vehicle.

* * * * *